June 18, 1929.  W. G. EXTON  1,717,702
INSTRUMENT FOR MEASURING TURBIDITY, COLOR,
AND OTHER CHARACTERISTICS OF FLUIDS, ETC
Filed March 23, 1927  4 Sheets-Sheet 1

INVENTOR
William G. Exton,
BY
George D. Richards
ATTORNEY June 18, 1929.  W. G. EXTON  1,717,702
INSTRUMENT FOR MEASURING TURBIDITY, COLOR,
AND OTHER CHARACTERISTICS OF FLUIDS, ETC
Filed March 23, 1927   4 Sheets-Sheet 3

June 18, 1929.　　　W. G. EXTON　　　1,717,702
INSTRUMENT FOR MEASURING TURBIDITY, COLOR,
AND OTHER CHARACTERISTICS OF FLUIDS, ETC
Filed March 23, 1927　　4 Sheets-Sheet 4

INVENTOR
William G. Exton,
BY
George D. Richards,
ATTORNEY

Patented June 18, 1929.

1,717,702

UNITED STATES PATENT OFFICE.

WILLIAM G. EXTON, OF NEW YORK, N. Y.

INSTRUMENT FOR MEASURING TURBIDITY, COLOR, AND OTHER CHARACTERISTICS OF FLUIDS, ETC.

Application filed March 23, 1927. Serial No. 177,819.

This invention relates, generally, to a novel instrument for measuring turbidities, colors and other characteristics of fluids or solids by optical observation; and the invention has reference, more particularly, to an instrument adapted to provide for a plurality of measurements respectively by different optical methods, whereby the correlation of the different kinds of measurements amount to and can be employed as a system of analysis to thereby furnish more accurate measurement and information as to the characteristics of the fluid thus examined.

In laboratories of pure and applied science the dispersed phase is so common that practically every substance at some time or another must be dealt with as one of the components of a dispersion, and because of the difficulties arising from the laborious round about and inadequate techniques which have been available for measuring and studying them, dispersions have achieved a special prominence and significance in biology and technology.

Every dispersion is characterized by the visual effect known as turbidity or cloudiness which may be so slight as to be imperceptible to the unaided eye or so pronounced as to appear opaque even in thin layers. While the appearances of different turbid media are similar to the extent of presenting the same visual effect to greater or less degree, it is well understood that turbidity is a very complex composite, the appearance of which depends upon the mass effect of the many different factors which contribute to it, especially:

1. The number of particles.
2. The size or size distribution of the particles.
3. The color of the particles.
4. The shape of the particles.
5. The transparency of the particles.
6. The index of refraction of the particles relative to the dispersing medium.

These factors individually and collectively are characteristic of the nature and concentration of the dispersed material, as well as the type of chemical or physical reaction.

It appears that hitherto the most that it has been attempted to get from turbidity measurements except experimentally has been a measurement of the concentration of a dispersed substance, and such measurements have proven notoriously unsatisfactory and unreliable in the case of nephelometers which measure turbidity by reflected light, and turbidimeters, such as the Duboscq colorimeter, which measure turbidity by transmitted light. Undoubtedly the failures are caused by confusion and disturbances occurring in the different factors as above enumerated which contribute to a turbidity.

Consideration of all of the factors contributing to turbidity makes it plain that by any of the single methods of measurement hitherto employed, discrepancies in the results obtained must occur unless all of the factors contributing to the turbidity remain constant. If one or more factors which contribute to a given turbidity deviate from the constant, the measurement is not only vitiated but the observer is left without any way of knowing that his measurement is wrong, unless he happens to be dealing with a solution of known nature and concentration, in which case there is no point in making a measurement of turbidity. This difficulty accounts for the fact that numerous workers question the possibility of reproducing dispersions and therefore look upon the hitherto existing methods of measuring concentration by turbidity as "tricky" and "unreliable". In the case of the nephelometer and Duboscq colorimeter this very difficulty is emphasized by the fact that the freshly prepared standards used for comparison in these instruments are not the same as the unknown sample and that changes which take place in the standards go on at different rates from the similar series of changes going on in the unknown turbidity which it is sought to measure. To avoid the difficulties connected with freshly prepared standards, permanent standards of opal glass or other materials have been incorporated in optical instruments which are known generally as Tyndallmeters. Tyndallmeters, however, have also proved disappointing not only because of the complexities inherent in a turbidity but also because they fail to provide a means for discovering and gaging the uncontrollable variants among the factors contributing to a turbidity.

In the instruments and methods disclosed in my copending applications for United States Letters Patent, Serial No. 570,459, filed June 23, 1922 and Serial No. 644,602, filed June 11, 1923, and Serial No. 64,364, filed October 23, 1925, I have sought to provide means to avoid troubles connected with the use of prepared standards, as well as other uncertainties connected with turbidity measurements, and in this way to provide an improved and safer means and method of measuring turbidity.

It is the principal object of the instant invention to provide an improved instrument of the general kind and character disclosed in my above referred to copending patent applications, which is adapted, however, to provide various and efficient means of making a number of different kinds of measurements simply, rapidly and handily without necessity of taking the examined sample out of the instrument; and, furthermore, to provide means for using extinction index criteria and photometric criteria in the same instrument.

Other objects of this invention, not at this time more particularly enumerated, will be clearly understood from the following detailed description of the same.

The invention is clearly illustrated in the accompanying drawings, in which:—

Similar characters of reference are employed in all of the hereinabove described views to indicate corresponding parts.

Referring to said drawings, the reference character 1 indicates a base. Secured to and extending upwardly from said base is a frame-plate 2 provided adjacent to its upper portion with a forwardly extending horizontal plate 3 provided with an aperture 4. The lower portion of said frame-plate 2 beneath said horizontal plate 3 is enclosed by a housing 5, arranged to provide a cabinet 6 at the forward side of said frame-plate 2, and an enclosed passage 7 at the rearward side of the latter. Said passage 7 is connected with and opens into a lamp-housing 8 of suitable shape and size, within the interior of which is suitably mounted a source of light, such, for example, as an electric lamp 9, in association with which may be arranged a suitable reflector 10.

Supported within the cabinet 6, but spaced upwardly from the lower end thereof, is a supporting stage 11 having an aperture 12. Mounted on said stage 11, so as to be aligned with the aperture 12 thereof, is an apertured cup-support 13 having supporting sides 14 provided on their opposed inner sides with ways or ledges 15 to support a high power extinction criteria target $x$ subsequently mentioned. Connected with the underside of said stage 11 is a slideway means 16 adapted to removably support a shutter plate 17 or an extinction criterion target plate as may be desired. The cabinet 6 is provided with a front opening giving access to the interior thereof, which opening may be closed by a door 18 when the instrument is in use. Suitably supported on a hanger 19 depending from the under side of the supporting stage 11 is a reflector 20, which is thus situated within the lower end of the cabinet 6 beneath the stage 11. The lower portion of said frame-plate 2 is provided with an aperture or opening 21 through which a beam of light from the lamp 9 is directed upon said reflector 20, to be reflected by the latter vertically upward through the apertures of the stage 11 and apertured cup-support 13, and through any interposed targets which are arranged in connection with the latter parts.

Mounted on the interior of a side wall of the cabinet 6 is a guideway 22 in which is mounted, for vertical movement, a slide-plate 23. Said slide-plate is provided with a rack 24 with which is engaged by a pinion 25, the spindle 26 of the latter projecting exteriorly from the side of the housing 5, and being provided on its outer extremity with a knob 27 for manipulating the same. Connected with the upper end of said slide-plate 23 is a laterally projecting bracket arm 28 having an internally threaded ring 29 at its free end in which is threaded the ferrule 30 to which is secured a downwardly projecting transparent optical plunger 31 which is vertically aligned with the apertures of the horizontal plate 3, stage 11 and apertured cup-support 13. The reference character 32 indicates a transparent fluid holding cup having an annularly enlarged upper end 33. Said fluid holding cup is removably supported by the cup-support 13 in alignment with the aperture of the latter and the aperture of the stage 11, and in the path of movement of the optical plunger 31, so that the latter, by manipulation of the side-plate 23 by which it is carried, may be raised and lowered within the cup interior to vary the depth of the column of fluid contained in the latter intermediate the bottom of the cup and the end of said plunger. The housing 5 is provided with an opening 34 registering with a portion of said slide-plate 23, the latter being provided with suitably graduations to provide a millimeter scale 35 which is exposed in said opening 34, the reading being made with reference to a fixed vernier scale 36. The reading of the scale from the front of the instrument is facilitated by the provision, adjacent to the point of reading, of a mirror 37. As will be understood the movement of the scale 35 corresponds to the movement of the plunger 31, the zero point corresponding to that position of the plunger in which it is brought down into the cup with its extremity engaged with the bottom of the latter.

The frame-plate 2 is further provided with an opening 38 longitudinally aligned with the side of the cup 32, said opening being controlled by vertically slidable shutter 39. Fixed on said shutter 39 is a rack 40 with which is engaged a pinion 41, the spindle 42 of which projects exteriorly from the side of the housing 5, the same being provided on its outer extremity with a knob 43 for manipulating the same. The raising of said shutter 39 admits a lateral beam of light from the lamp 9 with Tyndall beam effect upon the content of the fluid cup 32 which is under examination. By manipulating the shutter 39 the same may be raised or lowered to give any desired amount of opening according to the photometric adjustment necessary to obtain desired measurement criteria. In order to permit of the measurement of the amount of shutter opening, there is fixed on the outer side of the housing 5 a millimeter scale 44, adjacent to which is a slot 45. Fixed on the shutter 39 so as to move therewith is a bracket member 45, the free end portion of which projects exteriorly through said slot 45', and so as to be movable up and down relatively to said slot. Carried on the end of said bracket member 45 is a marker 46 to cooperate with said scale 44. In order to facilitate the reading of the scale 44 and market 46 from the front of the instrument, a mirror 47 is also carried by the exterior portion of said bracket member 45 to reflect the scale and marker reading toward the observer.

Mounted on the horizontal plate 3, which forms the top end wall of the cabinet 6, is a suitable frame-work 48 having apertures 49 aligned with the aperture 4 of said horizontal plate 3. Said frame-work 48 is provided with a horizontal guideway 50 to slidably mount relative to said aperture 4 a carrier frame 51 adapted to hold in end to end arrangement wedge members, one wedge member being turbid, that is adapted to scatter light transmitted therethrough while nevertheless obscuring an image of an illuminated target-mark, and the other wedge member being absorptive, that is adapted to absorb all transmitted light when obscuring the image of an illuminated target-mark, the latter type of wedge being similar in kind to that described in my copending application for United States Letters Patent, Serial No. 64,364, filed October 23rd, 1925. By the described arrangement of the wedge carrier frame 51, either of the wedges may be selectively employed. The movement of said wedge carrier frame 51, to bring one or the other of said wedges into operation, is effected by providing the same with a rack 52 operated by a pinion 53, the spindle 54 of which projects exteriorly from the frame-work, said spindle having a manipulating knob 55 on its free end. Said frame-work 48 is provided above said carrier frame guideway 50 with a second similar guideway 56 into which may be inserted when desired, for disposition across the path of light through the apertures 49, a suitable color filter (not shown).

Connected with the forward side of said frame-work 48 is an upstanding front-plate 57 having a lower horizontal aperture 58 and an upper horizontal aperture 59. Supported in registration with the rear side of said lower aperture 58 and in alignment with the apertures 49 is a reflecting prism 60 suitably enclosed by a casing 61, the same being adapted to reflect the light rays ascending through the target, if any, the fluid cup content and the optical plunger outwardly through said lower aperture 58. Aligned with and projecting forwardly from the front side of said lower aperture 58 is an eye-piece barrel or frame 62, the outer extremity of which is capped with an apertured end-piece 63. Connected with the rearward portion of said frame 62, so as to slide transversely thereof, is a carrier-member 64 having adjacent to one end thereof an unobstructed opening 64' and adjacent to the other end thereof a rotatable sleeve 65 in which is mounted a Nicol prism 66. Connected with said sleeve 65 is a lever arm 67, whereby the Nicol prism may be turned on its longitudinal axis through ninety degrees. By reason of the slidable arrangement of the carrier-member 64, the Nicol prism 66 may be aligned with the path of light, or it may be removed from the path of light by sliding the opening 64' into line when its effects are not desired. Mounted in the frame 62, in advance of the Nicol prism position is a Lummer-Brodhun cube 68 through which the light rays issuing from the aperture 58 are axially transmitted to the apertured end-piece 63 of the eye-piece barrel or frame. The lenses 69 provide a short-focus telescope with which to view the image of an illuminated target mark in the focus of the Lummer-Brodhun cube 68.

The upper end of said frame-plate 2 is disposed rearwardly of and parallel to said front plate 57 and is provided with an aperture 70 aligned with the aperture 59 of the latter. Supported in registration with the rear side of said aperture 70 is a reflecting prism 71, which is suitably enclosed by a casing 72, the lower end of which opens into the passage 7 of the lamp-housing 8. Suitably mounted beneath the lower end of said casing 72 is a reflector 73 adapted to reflect light from the lamp 9 upwardly to said reflecting prism 71. Extending from the front side of said aperture 70 is a suitable frame 74 in which is mounted, in fixed position, a polarizing Nicol prism 75, and aligned therewith and in advance thereof is an analyzing Nicol prism 76. The sleeve of the latter prism 76 is connected through a slot 77, by the fastening screw 78, with an external hand-wheel 79 with graduated indexed circle by means of which said prism 76 may be rotated about its longitudinal axis. Supported in connection with the outer end of said frame 74 is a reflecting prism 80 suitably enclosed by a casing 81, the lower end of which registers with an opening 82 in the upper side of the eye-piece barrel or frame 62 whereby light rays reflected by said reflecting prism are directed laterally upon said Lummer-Brodhun cube 68.

Mounted between said frame-plate 2 and frame 74 are transverse slideway forming members 83 and 84. Slidably arranged in said slideway member 83 is a carrier frame 85 provided with a graduated scale and index adapted to hold an absorption wedge 86, which may be moved across the path of light issuing from the reflecting prism 71. Said carrier frame 85 is provided with a rack 87 actuated by a pinion 88, the spindle of the latter projecting exteriorly and having at its outer end a knob 89 for manipulating the same, all whereby the wedge 86 may be brought into operation and adjusted at will. The said absorption wedge 86 may be used in conjunction or as an alternative to the polarizing and analyzing Nicol prisms 75 and 76, in which case the latter are removed from the frame 74. The slideway member 84 provides a support into which may be inserted, when desired, for disposition across the path of light, a color screen (not shown) calculated to modify the color of the transmitted light in such manner as may be desirable.

Figure 16:
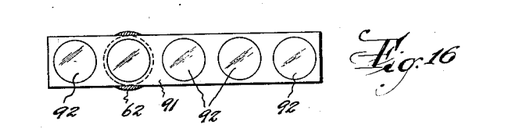
Figure 16 is a face view of an eye-piece color filter plate.

The end-cap of the eye-piece or barrel 62 may be slotted as at 90 to receive color filter screens. A color filter screen is shown in Figure 16, the same comprising a plate 91, having a plurality of color filter members 92 of variously selected colors, which may be selectively registered with the eye-piece by slidingly manipulating the plate 91 through the slots 90.

Figures 1, 4, 13, 14:
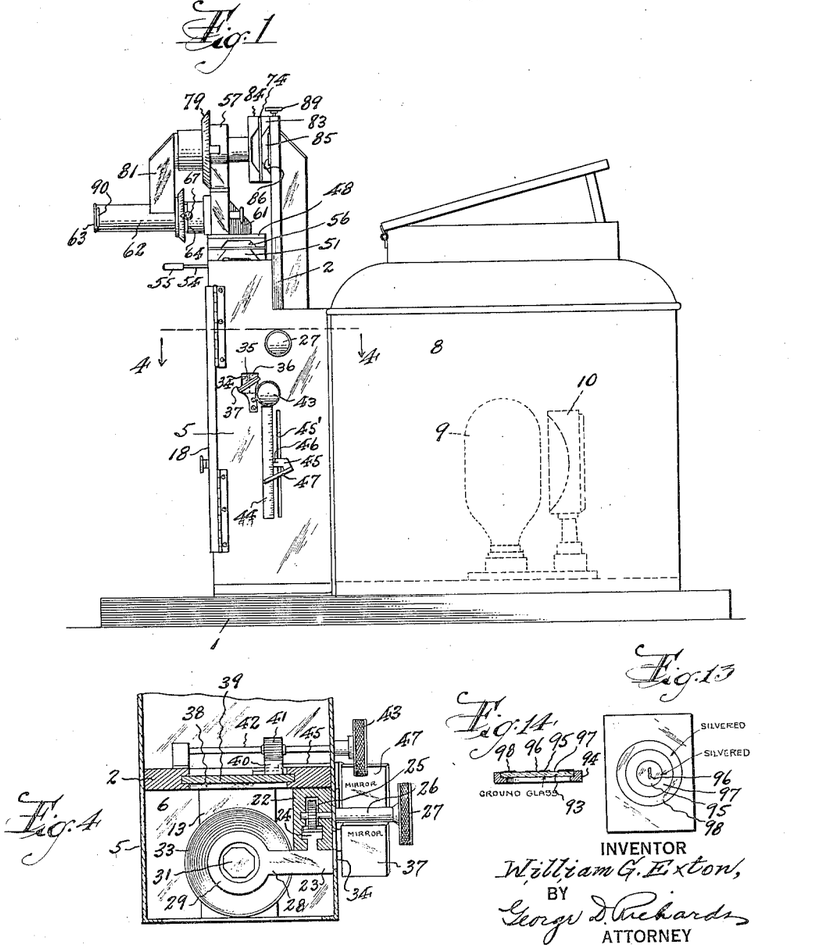
Figure 1 is a side view of the novel instrument made according to and embodying the principles of the instant invention.
Figure 4 is a fragmentary horizontal section, taken on line 4—4 in Figure 1.
Figure 13 is a plan view of an extinction criteria target.
Figure 14 is a transverse section therethrough.
Figure 2:
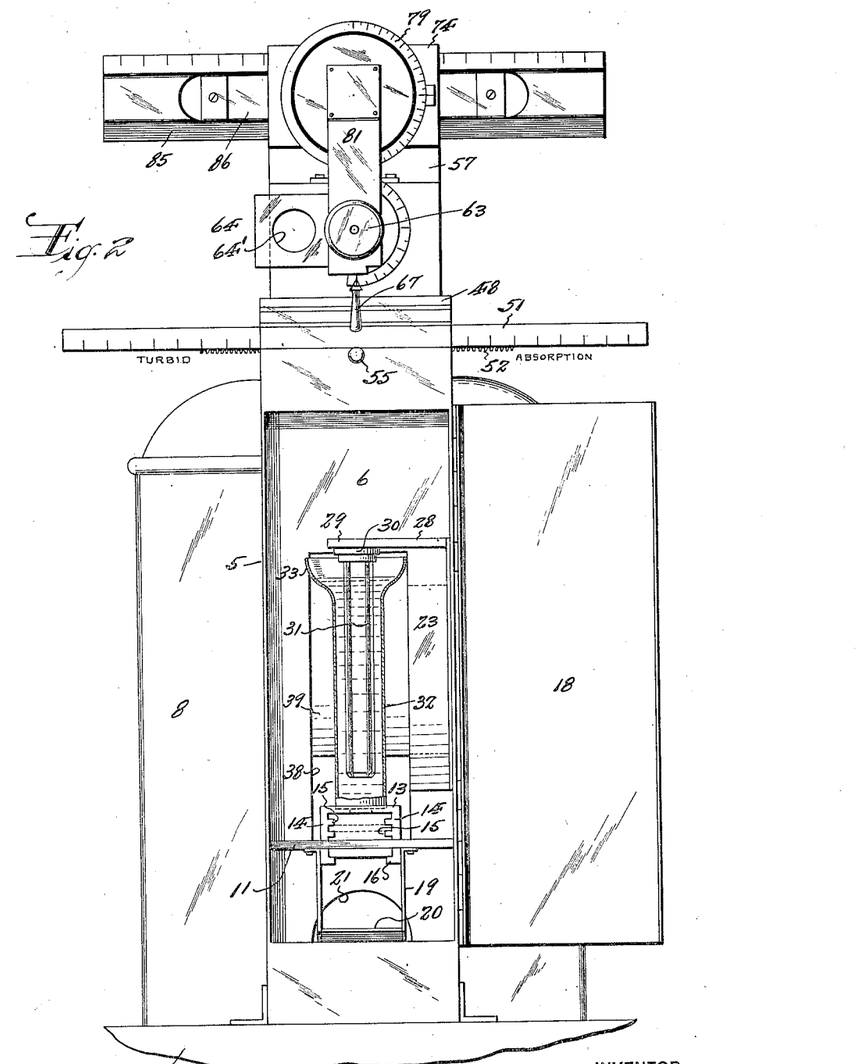
Figure 2 is a front elevation of the instrument, on an enlarged scale, with the front door thereof standing open.

In Figures 13 and 14 I have shown one form of target device for use in the above-described instrument, the same comprising a transparent glass plate or disc 93 mounted in a suitable frame 94, said disc being silvered at its central portion, as at 95, to render such portion opaque except for the short transparent central target mark 96. The disc is provided around said central opaque portion 95 with a transparent zone 97, around which is another silvered opaque portion 98, said zone 97 providing a contrasting field.

Figures 3, 15:
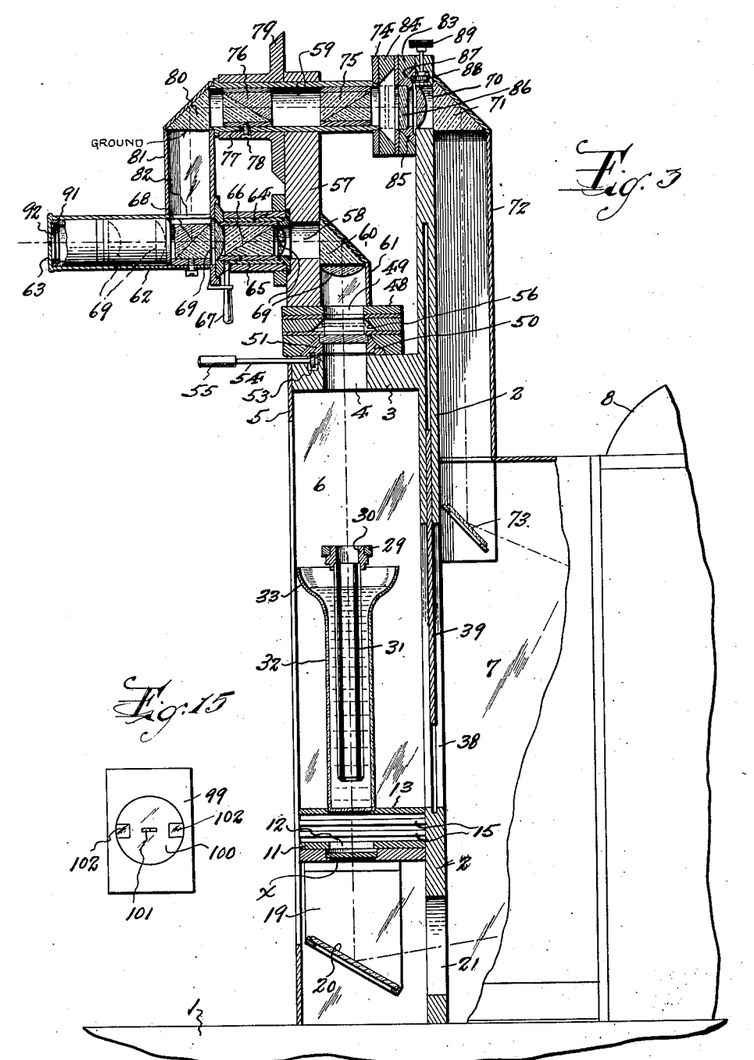
Figure 3 is a vertical longitudinal sectional view, the rear portion of the lamp housing being broken away.
Figure 15 is a plan view of a contrast target for extinction criteria in colorimetry.

In Figure 15 I have shown another form of target which is of especial advantage in colorimetry. This target consists of a transparent glass body 99 which is suitably framed to provide a silvered field 100 having a central transparent target mark 101, adjacent to said central target mark 101 are neutral filter panels 102 of light density for contrast with the target mark 101 and its surrounding opaque adaptation field.

Figures 5, 10, 11:
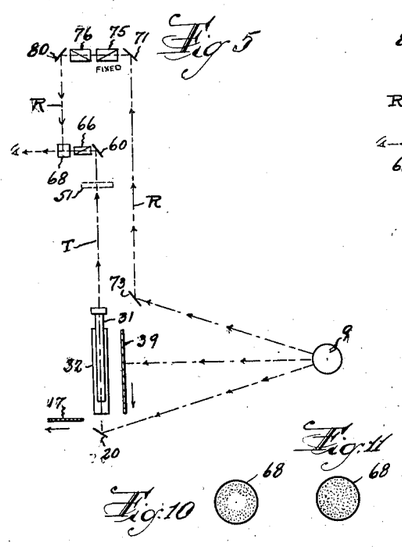
Figure 5 is a diagrammatic view showing the use of the instrument in measuring by diffused density.
Figures 10, 11 and 12 are respectively views, in different conditions, showing the central determination field and the annular or outer comparison field of a Lummer-Brodhum cube which is associated with the eye-piece of the instrument.
Figures 6, 7, 12:
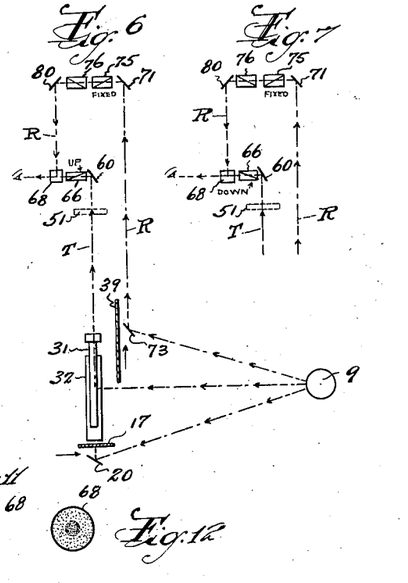
Figure 6 is a diagrammatic view showing use of the instrument in measuring by Tyndall effects, with light polarization in horizontal plane.
Figure 7 is a similar fragmentary diagrammatic view showing use of the instrument in measuring by Tyndall effects, with light polarization in vertical plane.

In the use of the instrument the fluid under examination is deposited in the cup 32 and light from the lamp 9 is reflected upwardly therethrough by the reflector 20, or the fluid directly illuminated by a Tyndall beam, or both, the light thus transmitted being reflected by the reflecting prism 60 axially to the Lummer-Brodhun cube thus providing a central subject field; at the same time light from the lamp 9 is reflected upwardly by the reflector 73 to the reflecting prism 71, thence to the reflecting prism 80 by which it is directed laterally upon the Lummer-Brodhun tube to illuminate an annular comparison field around the central subject field. The subject field comprising light transmitted to and through the cube, and the comparison field comprising light reflected by the cube. The effects of the light, thus transmitted in two planes substantially at right angles to each other, upon the Lummer- Brodhun cube 68, whereby the subject and comparison fields are produced, are illustrated in Figures 10, 11 and 12; Figure 10 showing a light subject field compared with the comparison field, Figure 12 a dark subject field compared with the comparison field, and Figure 11 a matching condition of subject and comparison fields.

By means of the novel instrument of this invention, various methods of measurement of fluids for turbidity or color may be practiced, and the results of the several methods correlated to furnish desired data as to the characteristic of the fluid under examination. Illustrative of some of the general methods to the practice of which the instrument is adapted are those diagramatically indicated in Figures 5 to 9 inclusive of the drawings.

In Figure 5 I have indicated the use of the instrument to obtain a measure of the concentration of a turbid fluid or dispersion, the criteria being the power of the dispersion to obscure transmitted light. In using the instrument for such method, the shutter 17 is removed to permit transmission of light, without an interposed target, upwardly to and through the fluid in the cup 32, side light or Tyndall beams being shut off by closing the shutter 39. The transmitted light T traversing the fluid and plunger 31 is reflected by the reflector 60 to the subject field of the Lummer-Brodhun cube 68. The comparison field of the cube 68 is illuminated by reflecting the light rays R. By racking the plunger 31 up or down the depth of the fluid is varied until that depth thereof is ascertained which will obscure the transmitted light rays to the degree necessary to match the intensity of the subject field with the comparison field of the Lummer-Brodhun cube, at which point a reading of the plunger scale is taken. In the practice of this method of measurement, either the turbid or absorption wedges of the wedge carrier 51 may be employed as compensating means; or with the plunger at a predetermined fluid depth producing position, the said wedge may be manipulated until matching of the subject field and comparison field in the cube 68 occurs, whereupon reading of the wedge scales provides data for calculations of measurement.

In Figure 6 I have illustrated the use of the instrument to obtain measurements by Tyndall beam effects with polarization in horizontal plane of the light transmitted to the subject field, and in Figure 7 the same method is illustrated with polarization in vertical plane of the light transmitted to the subject field. The desired polarizing effects are obtained by adjusting the Nicol prism 66. In employing these methods, the intensity of the reflected light of the comparison field may be controlled by turning the analyzing Nicol prism 76. In the practice of these methods bottom light is shut off by closing the shutter 17, and the Tyndall beam is controlled by raising and lowering the shutter 39. The transmitted light directed to the subject field is the scattered light reflected by the particles of the dispersion. Reading of the scale of the shutter 39, readings of the plunger scale, and readings of the scales of the wedges of the device 51, may be utilized as data for calculating desired measurements; scale readings obtained when using transmitted light polarized in horizontal plane, and similar readings obtained when using transmitted light polarized in vertical plane may be utilized to obtain information ratios. These methods are of particular advantage in providing data for computing the size and shape and other characteristics of the particles of a dispersion.

Figure 8:
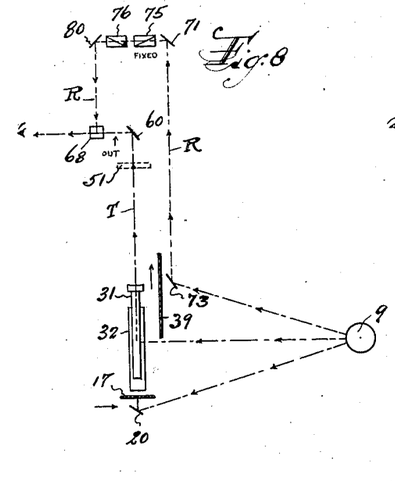
Figure 8 is a diagrammatic view showing use of the instrument in measuring by Tyndall effects without light polarization.

In Figure 8 I have illustrated the manner of using the instrument to measure the concentration of a dispersion by Tyndall beam effects without polarization of the transmitted light, such light being the scattered light reflected by the particles of the dispersion. This method is of particular advantage in determining the turbidities of high dilutions, that is dispersions containing very fine particles.

Figure 9:
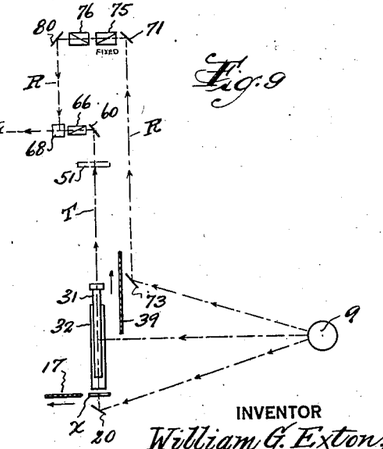
Figure 9 is a diagrammatic view showing use of the instrument in measuring by extinction index.

In Figure 9 I have illustrated the use of the instrument in obtaining measurements by the extinction index of the dispersion, that is its power to obscure a target mark which is illuminated by light transmitted therethrough and then through the fluid examined to the subject field. This method, in general, is clearly set forth in my heretofore mentioned copending patent applications. In the use of this method either the type of target $x$ shown in Figure 15 (which is preferred) or that shown in Figures 13 and 14 may be employed. In the present instrument, however, this method carries the disappearance criterion further and to a higher degree of refinement than has been hitherto possible, in this way making the disappearance criterion sensitive and accurate enough so as to be available for finer determinations. The method embodied in the use of the instrument avoids all the difficulties connected with standards because the turbidity readings are made directly on the scale of a depth changing plunger or the scales of compensating wedges. The method has additional advantages of being practically free from the effects of color differences and light intensity. It is also experimentally demonstrable that the method, as practiced in the instant instrument, by balancing both transmitted and reflected light to obscure a predetermined target achieves a compensation effect which gives a more general measure of turbidity with stronger tendencies to simpler proportionality over greater ranges of dilution and concentration than has heretofore been possible.

When one measures the same turbid sample by the methods available in the use of the instrument of this invention, and checks the measurements with those made by the Tyndall effect (nephelometer) and by diffuse density (Duboscq colorimeter) it becomes apparent that each of these latter methods of measurement is preponderatingly sensitive to one or another function of the turbidity complex and at the same time comparatively insensitive to other features of the turbidity complex. This seems to have been hitherto not appreciated but becomes easily apparent when one correlates such measurements by comparing curves plotted from measurements made by the different optical methods on the same turbid sample in different dilutions or concentrations. It seems also not to have been appreciated that the correlation of the results of different light effects or kinds of optical measurements of the same turbidity yield exact information as to whether or no an observer may be dealing with a turbidity which represents a true measure of concentration as the result of reproducibility of a given reaction. If one attempts to make use of a turbidity measurement for the purpose of measuring the concentration of a given precipitation or other type of reaction, it is a simple matter to calibrate the test by measuring the turbidities of several dilutions or concentrations by the different optical methods. If an unknown sample be tested similarly and then measured by the same different optical methods, the correlation of these measurements will tell distinctly whether or no there is any deviation from the established calibration for the particular test. Furthermore, differences between the different measurements will show not only whether reproducibility has been achieved but will also give definite information concerning the state of the individual factors entering into the turbidity. By making measurements with the different light effects at intervals after the incipiency of a reaction, information as to its mechanism and also as to the nature of the changes going on in the process of the reaction may be gained.

In fact, it seems not to have been hitherto appreciated that the measurements of turbidity made by different light effects give characteristic values for the turbidity for each effect and the correlation of such values obtained by different light effects reveals information concerning the separate different factors contributing to the turbidity. As an illustration, one may take the well known and important tests for measuring proteins in urine or blood by means of the nephelometer or Duboscq colorimeter. Notwithstanding the fact that experience with such methods often turns out satisfactorily, turbidity measurements have been abandoned in favor of much more laborious and time-consuming techniques because of the irregularity of the results which at times vary widely from the correct values. Thus, if the proteins of serum or urine be precipitated by any of the usual techinques, the resulting turbidities are affected by any change of technique, or by unknown precipitable substances which may be present and form clouds that change the nature of the expected precipitate. In such cases deviations from the expected cause wrong results not because of failure of the turbidity measurement, but because the fault really lies with the worker or with some accidental condition of the sample. Thus in measuring the protein of blood, usually the total proteins, or albumin and globulin, foreign substances are sometimes present which spoil the test but which the worker remains ignorant of who uses only one means of measuring turbidity. Similarly, in the urine, albumin if present will be precipitated and appear as a cloud which is indistinguishable from a similar cloud resulting from the precipitation of some other protein or substance which may be unexpectedly present as a contamination or otherwise if but one optical method be employed. Thus very often protamins are found in the urine which when precipitated by the usual albumin reagents yield a cloud which has the same appearance as the albumin cloud. If, however, two or more different types of optical methods be employed in measuring such a specimen, it becomes immediately apparent that the cloudiness is not due to albumin but to some other substance. Even if the specimen contained both protamins and the expected albumin, the correlation of the measurements by several optical methods will show that this is the case and thus protect the worker from being misled.

Thus by not relying on any one method of optical measurement as has hitherto been the practice, but by measuring the sample by two or more different optical methods it becomes possible not only to study the nature of a given reaction but also to learn the effects of time, temperature and chemical and physical changes involved in the reaction. In fact, the correlation of different kinds of measurements amount to and can be employed as a system of analysis which has not been hitherto available. The instrument of this invention is, therefore unique in providing various and efficient means of making a number of different kinds of measurements simply, rapidly and handily without taking the sample out of the instrument. It is also unique in that it provides means for using extinction index criteria and photometric criteria in the same instrument. This is achieved by using a common light source and by means of special targets working with a depth-changing plunger in conjunction with both absorption and turbid wedges and the adjustment of light and other polarization effects with Nicol prisms. By providing rapid means for changing the light effects obtained by both extinction and photometric criteria and the use of absorption and turbid wedges in conjunction with crossed Nicols, it is possible to measure not only liquids but semi-liquids like jellies, solid material, smokes, gases, etc., as well as solutions of such delicate nature that they cannot be disturbed in anyway without harming them, as the measurements can be carried out either at a constant depth or by changing the thickness of the layer of fluid examined. Thus with the instant instrument it is possible to make many different kinds of measurements which can be divided into separate types, each of which can be made 1. At a given fluid depth
2. With absorption wedge at a given position
3. With turbid wedge at a given position
4. With given color filters thus enabling a four fold variation of each type. All of these measurements are useful in measuring the same sample at different thicknesses and volumes and in differently colored lights because for purposes of classification it is necessary and advantageous to have a sufficient number of variants by which to characterize the dispersion. For turbidity with the extinction criterion the low power target is used for concentrated samples and the high power target for dilute ones. With the photometric criterion diffuse density is measured by transmitted light and the Tyndall effect by reflected and scattered light, using the unpolarized beam as well as either the vertical or horizontally polarized components of the Tyndall beam. The color measurements are made with the extinction criterion, using the special target shown in Figure 15 and which is a feature of the instrument, and by the photometric criterion which is a measure of either the molecular absorption or fluorescence.

As many changes could be made in the construction of the instrument and many apparently widely different embodiments of this invention could be made without departing from the scope thereof, it is intended that all matter contained in the above description or shown in the accompanying drawings shall be interpreted as illustrative and not in a limiting sense.

I claim:—

1. In an instrument of the kind described, means to transmit light to a fluid under examination, means providing a subject field and an adjacent comparison field, means for transmitting the light traversing said field to and through said subject field, means to polarize the light thus transmitted to said subject field, means to independently transmit light to said comparison field whereby the latter is illuminated independently of said subject field, and means for simultaneously viewing said fields.

2. In an instrument of the kind described, means to transmit light to a fluid under examination, means providing a subject field and an adjacent comparison field, means for transmitting the light traversing said fluid to and through said subject field, means to polarize the light thus transmitted to said subject field, means to independently transmit light to said comparison field whereby the latter is illuminated independently of said subject field, means for varying the intensity of said independent light, and means for simultaneously viewing said fields.

3. In an instrument of the kind described, means to transmit light to a fluid under examination, means providing a subject field and an adjacent comparison field, means for transmitting the light traversing said fluid to and through said subject field, compensating wedge means located in the path of such transmitted light intermediate the fluid under examination and said subject field, means to independently transmit light to said comparison field whereby the latter is illuminated independently of said subject field, and means for simultaneously viewing said fields.

4. In an instrument of the kind described, means to transmit light to a fluid under examination, means providing a subject field and an adjacent comparison field, means for transmitting the light traversing said fluid to and through said subject field, compensating wedge means located in the path of such transmitted light intermediate the fluid under examination and said subject field, means to polarize the light thus transmitted to said subject field, means to independently transmit light to said comparison field whereby the latter is illuminated independently of said subject field, and means for simultaneously viewing said fields.

5. In an instrument of the kind described, means to transmit light to a fluid under examination, means providing a subject field and an adjacent comparison field, means for transmitting the light traversing said fluid to and through said subject field, compensating wedge means located in the path of such transmitted light intermediate the fluid under examination and said subject field, means to polarize the light thus transmitted to said subject field, means to independently transmit light to said comparison field whereby the latter is illuminated independently of said subject field, means for varying the intensity of said independent light, and means for simultaneously viewing said fields.

6. An instrument of the kind described, comprising a light-proof cabinet, a transparent fluid cup, means for supporting said fluid cup, means for varying and measuring the depth of the content of said fluid cup, a source of light mounted exteriorly of said cabinet, means connected with said cabinet operatable to admit light to said fluid cup content for transmission axially therethrough, additional means to admit light to said fluid cup content for transmission transversely thereof in the manner of a Tyndall beam, said respective light admission means being capable of selective use singly or in combination, means for measuring the amount of Tyndall beam effect, means providing a subject field adapted to be illuminated by such transmitted light, said latter means also providing a comparison field adjacent to said subject field, means to independently transmit light from said light source to said comparison field whereby the latter is illuminated independently of said subject field, and means for simultaneously viewing said fields.

7. An instrument as defined in claim 6, having means to polarize the light transmitted to said subject field.

8. An instrument as defined in claim 6, having means to vary the intensity of the independent light transmitted to said comparison field.

9. An instrument as defined in claim 6, having means to polarize the light transmitted to said subject field, and means to vary the intensity of the light transmitted to said comparison field.

10. In an instrument as defined in claim 6, a target element, and means to introduce said target element beneath said fluid cup in the path of the light transmitted axially through the content of the latter.

11. In an instrument as defined in claim 6, measuring wedge means adjustably mounted to extend across the path of light transmitted to said subject field.

12. In an instrument as defined in claim 6, a target element, means to introduce said target element beneath said fluid cup in the path of light transmitted axially through the content of the latter, and measuring wedge means adjustably mounted to extend across the path of light transmitted to said subject field.

13. In an instrument as defined in claim 6, means movable into the path of light transmitted to said subject field for modifying the color thereof.

14. In an instrument as defined in claim 6, means movable into the path of light transmitted to said comparison field for modifying the color thereof.

15. In an instrument as defined in claim 6, means movable into the path of light transmitted to said subject field for modifying the color thereof, and similar means movable into the path of light transmitted to said comparison field for modifying its color.

16. In an instrument as defined in claim 6, in which the means for viewing said subject and comparison fields is provided with means for altering the color appearance of said fields.

17. An instrument of the kind described, comprising a light-proof cabinet, a transparent fluid cup, means for supporting said fluid cup in vertical position within said cabinet, a removable target element, means to support said target element beneath and in axial alignment with said fluid cup, a reflector member for transmitting light axially through said target element and said fluid cup, a light source, said cabinet having an opening intermediate said light source and said reflector member, removable means to obstruct the passage of light from said reflector member when desired, said cabinet having an opening laterally opposed to said fluid cup and intermediate the same and said light source to transmit light transversely of said fluid cup with Tyndall beam effect, a movable shutter cooperating with said latter opening to control such Tyndall beam effect, means cooperating with said shutter to measure such Tyndall beam effect, optical means for varying and measuring the depth of the content of said fluid cup, a photometric prism providing a subject field and an adjacent comparison field, optical means for transmitting light traversing said fluid cup content to the subject field of said prism, means to independently transmit light from said light source to said comparison field whereby the latter is illuminated, and optical means for viewing the fields of said prism.

18. An instrument as defined in claim 17, having means selectively movable into and out of the path of light transmitted to the subject field of said prism to polarize said light.

19. An instrument as defined in claim 17, having means to vary the intensity of the independent light transmitted to said comparison field of said prism.

20. An instrument as defined in claim 17, having means selectively movable into and out of the path of light transmitted to the subject field of said prism to polarize said light, and means to vary the intensity of the independent light transmitted to said comparison field of said prism.

21. An instrument as defined in claim 17, having a measuring wedge means adjustably mounted to extend across the path of light transmitted to said subject field of said prism.

22. An instrument as defined in claim 17, having means selectively movable into and out of the path of light transmitted to the subject field of said prism to polarize said light, and having a measuring wedge means adjustably mounted to extend across the path of light transmitted to said subject field of said prism.

23. An instrument as defined in claim 17, having selective means to modify the color appearance of either said subject field, said comparison field, or both of said fields at will.

24. As an element of an instrument of the kind described, a target member comprising a transparent body having a portion of its surface treated to obstruct the passage of light therethrough thereby providing an opaque zone, a centrally located transparent target mark within said opaque zone, and transparent panels also within said opaque zone adjacent to but spaced from said target mark.

In testimony, that I claim the invention set forth above I have hereunto set my hand this 21st day of March, 1927.

WILLIAM G. EXTON.